United States Patent
Varma et al.

(12)

(10) Patent No.: US 8,515,444 B1
(45) Date of Patent: Aug. 20, 2013

(54) ALLOCATION OF SIGNAL QUALITY FEEDBACK BANDWIDTH

(75) Inventors: Subir Varma, Ashburn, VA (US); Durga Prasad Satapathy, Olathe, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1213 days.

(21) Appl. No.: 12/175,696

(22) Filed: Jul. 18, 2008

(51) Int. Cl.
*H04W 72/00* (2009.01)
*H04B 7/00* (2006.01)

(52) U.S. Cl.
USPC .................................. 455/452.2; 455/522

(58) Field of Classification Search
USPC .............. 455/452.2, 453, 522, 450; 370/236, 370/328, 329, 252, 334
See application file for complete search history.

(56) References Cited

U.S. PATENT DOCUMENTS

| 2004/0190507 A1* | 9/2004 | Wu et al. ........................ 370/389 |
| 2006/0250963 A1* | 11/2006 | Jin et al. ........................ 370/236 |
| 2007/0070952 A1* | 3/2007 | Yoon et al. .................... 370/334 |
| 2008/0075038 A1* | 3/2008 | Jin et al. ........................ 370/329 |

OTHER PUBLICATIONS

Wimax Forum, "Mobile WiMAX—Part I: A Technical Overview and Performance Evaluation," Aug. 2006, pp. 1-53.

\* cited by examiner

*Primary Examiner* — Michael Faragalla
(74) *Attorney, Agent, or Firm* — O'Brien Jones, PLLC

(57) ABSTRACT

A signal quality feedback slot is periodically allocated to a wireless device in one out of every $E^n$ frames. The variable n is greater than or equal to zero and less than $N_{max}$. The variable E is an integer greater than one. The variable n is increased if an indicator of RF conditions satisfies a first criteria. The variable n is decreased to a minimum value if a plurality of retry requests from the wireless device satisfy a retry criteria.

11 Claims, 7 Drawing Sheets

ALLOCATE A FIRST AMOUNT OF BANDWIDTH FOR A WIRELESS DEVICE TO SEND SIGNAL QUALITY INFORMATION
302

ALLOCATE A SECOND AMOUNT OF BANDWIDTH FOR THE WIRELESS DEVICE TO SEND SIGNAL QUALITY INFORMATION IF AN INDICATOR OF RF CONDITIONS REMAINS RELATIVELY CONSTANT FOR A FIRST PERIOD OF TIME
304

ALLOCATE A THIRD AMOUNT OF BANDWIDTH FOR THE WIRELESS DEVICE TO SEND SIGNAL QUALITY INFORMATION IF RETRY REQUESTS SATISFY A RETRY CRITERIA
306

ALLOCATION OF SIGNAL QUALITY FEEDBACK BANDWIDTH

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of allocating signal quality feedback bandwidth is disclosed. A first amount of bandwidth is allocated for a wireless device to send signal quality information to a base station. If an indicator of RF conditions satisfies a first criteria, a second amount of bandwidth is allocated for the wireless device to send signal quality information to the base station.

A method of allocating signal quality feedback slots is disclosed. A signal quality feedback slot is periodically allocated to a wireless device in one out of every $E^n$ frames. The variable n is greater than or equal to zero and less than $N_{max}$. The variable E is an integer greater than one. The variable n is increased if an indicator of RF conditions satisfies a first criteria. The variable n is decreased to a minimum value if a plurality of retry requests from the wireless device satisfy a retry criteria.

A method for allocating signal quality feedback bandwidth is disclosed. A wireless device is assigned to a first state. The first state allocates the wireless device a signal quality feedback slot every N frames. N is an integer greater than zero. The wireless device is transitioned to a second state if an indicator of RF conditions remains within a first range for a first number of frames. The second state allocates the wireless device the signal quality feedback slot every N*N frames. The first number of frames is increased if the indicator of RF conditions indicates that RF conditions have improved and exceed the first range. The wireless device is transitioned to the first state if the indicator of RF conditions indicates RF conditions have deteriorated below the first range.

DETAILED DESCRIPTION

Figure 1:
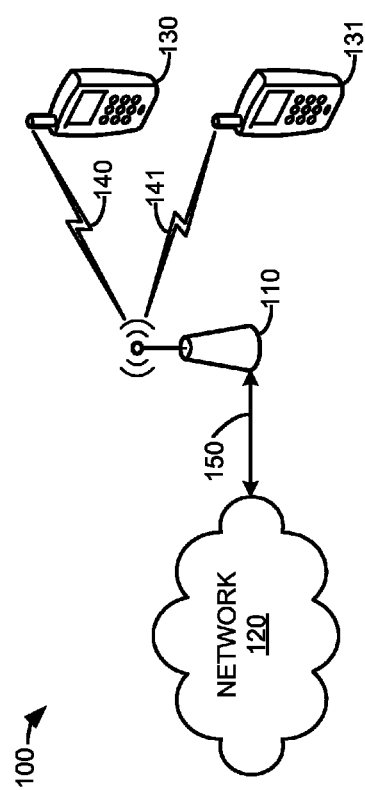
FIG. 1 is a block diagram of a communication system.

FIG. 1 is a block diagram illustrating a communication system. In FIG. 1, communication system 100 comprises base station 110, network 120, wireless device 130, wireless device 131, wireless link 140, wireless link 141, and backhaul link 150.

Wireless device 130 and wireless device 131 may be operatively coupled to base station 110 by wireless links 140 and 141, respectively. Base station 110 is operatively coupled to network 120 via backhaul link 150. Thus, wireless device 130 and wireless device 131 may be operatively coupled to network 120.

Wireless device 130 or wireless device 131 may be any device, system, combination of devices, or other such communication platform capable of communicating with base station 110 via wireless links 140 and 141, respectively. Wireless device 130 or wireless device 131 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via wireless links. Other types of communication platforms are possible.

Base station 110 may be any wireless system that provides the air interface to wireless device 130 and wireless device 131, and communication connectivity to network 120 via backhaul link 150. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 120 may comprise a computer, a network, or a collection of computers and networks that couple, link, or otherwise operatively provide wireless device 130 and wireless device 131 with communication service. It should be understood that network 120 may comprise secondary data networks. For example, network 120 may include a backhaul network, a local network, a long distance network, a packet network, or any combination thereof, as well as other types of networks. Network 120 may be or include an access service network (ASN), an access service network gateway (ASN-GW), wireless local access network access gateway (WAG), packet data gateway (PDG), mobile switching center (MSC) and packet data serving node (PDSN).

Wireless device 130 and wireless device 131 may establish communication sessions with base station 110 in order to receive communication services via network 120 and via wireless links 140 and 141, respectively. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

The amount of data that can be exchanged via wireless links 140 and 141 depends upon air interface factors such as the number of wireless devices communicating via base station 110, interference, clutter, morphology, wireless device location, signal to interference and noise ratio (SINR), and wireless device mobility. To account for these air interface variations, a wireless standard may specify the utilization of multiple modulation and coding schemes that are selected based on air interface conditions. This allows wireless devices with poor air interface conditions to utilize a low bit rate modulation with a high redundancy coding scheme. Wireless devices with good air interface conditions may utilize higher bit rate modulation with a low or no redundancy coding scheme. Thus, wireless devices with good air interface conditions can exchange more data with base station 110 in a given time (or symbol) and frequency block than a wireless device with poor air interface conditions. A time and frequency block may be referred to as a slot.

In order to select a correct transmit power, or modulation and coding scheme, a wireless standard may specify the ability to send signal quality information from wireless device 130 or 131 to base station 110. For example, WiMAX specifies a channel quality indicator channel (CQICH) that may be used to provide air interface condition information (such as SINR) in an uplink slot to base station 110. The CQICH may be comprised of multiple slots thereby allowing multiple wireless devices to provide signal quality information to base station 110 each frame.

Based at least partially on the signal quality information received from wireless device 130 and wireless device 131, base station 110 may determine the modulation and coding level that should be used by wireless device 130 and wireless device 131, respectively. Only a single wireless device 130 or wireless device 131 may provide signal quality feedback in a particular uplink slot. Thus, in the case where there are many active wireless devices 130 and 131 registered with base station 110, the total number of slots allocated as CQICH slots creates a limit on the number of wireless devices 130 and 131 that base station 110 may support at any one time.

In an embodiment, base station 110 adaptively varies the gap between frames in which a signal quality feedback slot is allocated to a particular wireless device 130 or wireless device 131. The frequency of frames in which a particular wireless device 130 or 131 is allocated a signal quality feedback slot is a function of an indicator of RF conditions associated with that wireless device 130 or 131, respectively. For example, base station 110 may allocate a first amount of bandwidth (i.e., number of slots per second) that wireless device 130 may use to provide signal quality information to base station 110. Then, if a first criteria related to RF conditions is satisfied, base station 110 may allocate a second amount of bandwidth for wireless device 130 to use to provide signal quality information to base station 110. This second amount of bandwidth may be less than the first amount of bandwidth.

For example, if wireless device 130 is associated with an indicator of RF conditions that does not increase or decrease significantly over a threshold period of time, then base station 110 may decrease the amount of bandwidth allocated for wireless device 130 to provide signal quality feedback information. In an embodiment, this indicator of RF conditions may be a modulation and encoding scheme associated with wireless device 130. In an embodiment, the indicator of RF conditions may be a SINR associated with wireless device 130.

In an embodiment, base station 110 may allocate the second amount of bandwidth by decreasing the number of slots per second. For example, if base station 110 is allocating wireless device 130 a signal quality feedback slot in each uplink frame, base station 110 may allocate a second amount of bandwidth by allocating wireless device 130 a signal quality feedback slot every other frame. This reduces the bandwidth allocated to wireless device 130 for signal quality feedback by half. Likewise, if base station 110 is allocating wireless device 130 signal quality feedback slot every other frame base station 110 may allocate a second amount of bandwidth by allocating wireless device 130 a signal quality feedback slot every fourth frame. In another example, if base station 110 is allocating wireless device 130 a signal quality feedback slot every third frame, base station 110 may allocate a second amount of bandwidth by allocating wireless device 130 a signal quality feedback every ninth frame. Other ratios, or multiples, of a first amount of bandwidth to a second amount of bandwidth are possible.

In an embodiment, base station 110 may continue to allocate the first amount of bandwidth allocated to wireless device 130 if an indicator of RF conditions indicates that RF conditions have improved. For example, if an indicator of RF conditions indicates that the RF conditions associated with wireless device 130 have improved before a threshold period of time has passed, then base station 110 may extend the threshold period of time. In an embodiment, when an indicator of RF conditions indicates that RF conditions have improved more than a first threshold amount, and this improvement has occurred before a second threshold amount of time has passed with the RF conditions not improving, or degrading a threshold amount, base station 110 may: (1) extend the second threshold amount of time by increasing the second threshold, or (2) reset a timer such that the second threshold amount will not be reached until a later time.

In an embodiment, the RF conditions associated with wireless device 130 or wireless device 131 may degrade over a period of time. Base station 110 may detect this by tracking a number of transmission retry requests that occur over a period of time. Examples of retry request schemes are automatic repeat request (ARQ) or hybrid automatic repeat requests (HARD). When a threshold number of retry requests associated with wireless device 130 occur over a certain period of time, base station 110 may allocate a third amount of signal quality feedback to wireless device 130. This amount of bandwidth may be the maximum amount of signal quality feedback that may be allocated to a particular wireless device 130 or 131. For example, the third amount of bandwidth allocated may be as much as the maximum number of signal quality feedback slots that may be allocated to a single wireless device in each frame. The maximum number of signal quality feedback slots that may be allocated to a single wireless device may be a signal quality feedback slot in each frame.

Figure 2:
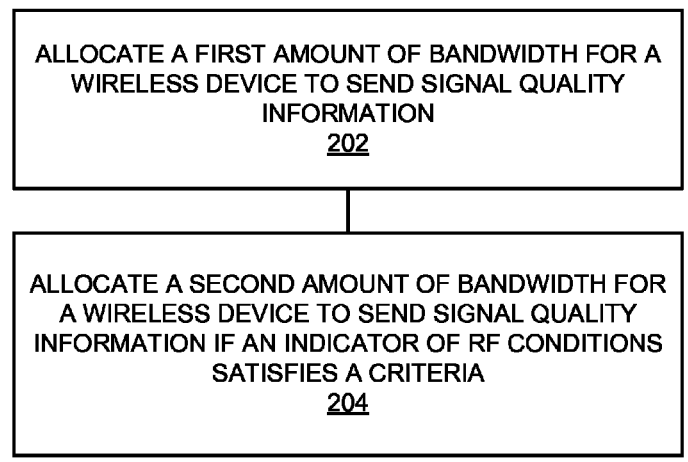
FIG. 2 is a flowchart illustrating a method of allocating signal quality feedback bandwidth.

FIG. 2 is a flowchart illustrating a method of allocating signal quality feedback bandwidth. The steps illustrated in FIG. 2 may be performed by one or more elements of communication system 100.

A first amount of bandwidth is allocated for a wireless device to send signal quality information (202). For example, base station 110 may allocate a first amount of bandwidth (i.e., signal quality feedback slots per second) to wireless device 130 for wireless device 130 to send signal quality information to base station 110. This first amount of bandwidth may comprise the signal quality feedback slot every frame. In another example, this first amount of bandwidth may comprise a signal quality feedback slot every N frames. N may be an integer greater than or equal to one.

A second amount of bandwidth may be allocated for the wireless device to send signal quality information if an indicator of RF conditions satisfies a criteria (204). For example, base station 110 may allocate a second amount of bandwidth for wireless device 130 to send the signal quality information to a station 110 if an indicator of RF conditions associated with wireless device 130 satisfies a criteria. This criteria may be an indication that the RF conditions associated with wireless device 130 have not changed significantly for a threshold period of time.

The second amount of bandwidth may be a fraction of the first amount of bandwidth. For example, base station 110 may allocate the first amount of bandwidth that is a signal quality feedback slot every N frames. Base station 110 may then allocate a second amount of bandwidth that is a signal quality feedback slot every N*N frames. In another example, base station 110 may allocate a second amount of bandwidth that is a signal quality feedback slot every N+M frames. In another embodiment, base station 110 may allocate a second amount of bandwidth that is a signal quality feedback slot every N*C frames. C is a constant chosen to set the second amount of bandwidth relative to the first amount of bandwidth.

In another example, base station 110 may allocate a second amount of bandwidth based on a criteria that includes an indication that RF conditions have degraded more than a threshold amount. For example, base station 110 may allocate a second amount of bandwidth based on a threshold number of retry requests satisfying a retry criteria. In particular, station 110 may allocate a second amount of bandwidth based on the number of transmission retries associated with wireless device 130 exceeding the threshold number of retries in a certain period of time.

Figure 3:
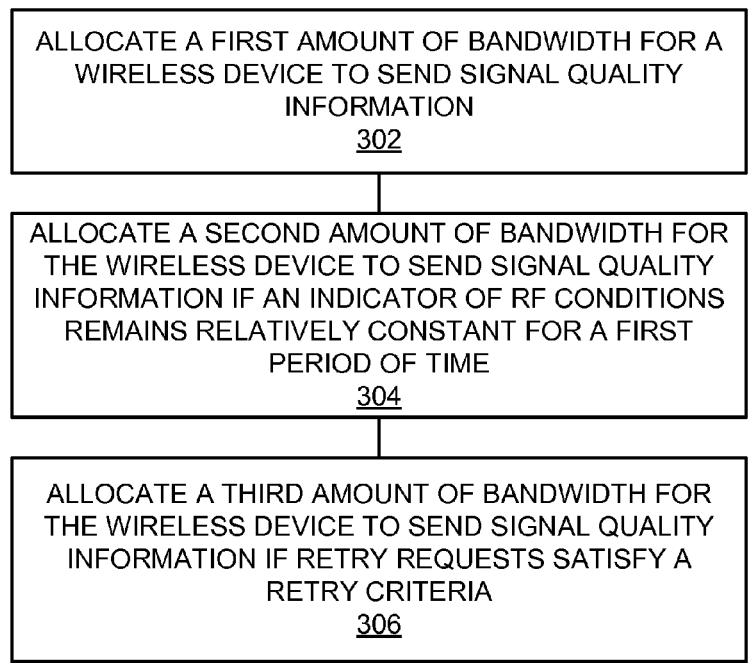
FIG. 3 is a flowchart illustrating a method of allocating signal quality feedback slots.

FIG. 3 is a flowchart illustrating a method of allocating signal quality feedback slots. The steps illustrated in FIG. 3 may be performed by one or more elements of communication system 100.

A first amount of bandwidth is allocated for a wireless device to send signal quality information (302). For example, base station 110 may allocate one CQICH slot in every uplink frame to wireless device 131. In another example, base station 110 may allocate one CQICH slot every N uplink frames to wireless device 131. N may be any number greater than or equal to one.

A second amount of bandwidth is allocated for the wireless device to send signal quality information if an indicator of RF conditions remains relatively constant for a first period of time (304). For example, base station 110 may allocate one CQICH slot every other uplink frame to wireless device 131 if the modulation and coding scheme associated with wireless device 131 remains constant for one minute. In another example, base station 110 may allocate one CQICH slot every N*N uplink frames to wireless device 131 if the modulation and coding scheme associated with wireless device 131 remains constant for M consecutive frames. M may be any number greater than one. For example, M may be chosen to be 12,000 which would approximate a threshold time period of one minute for uplink frames that are sent every 200 milliseconds.

A third amount of bandwidth is allocated for the wireless device to send signal quality information if retry requests associated with the wireless device satisfy a retry criteria (306). For example, base station 110 may allocate one CQICH slot in every uplink frame to wireless device 131 if the number of transmission retries associated with wireless device 131 exceed a threshold number of retries in a certain period of time. In another example, base station 110 may allocate one CQICH slot in every uplink frame to wireless device 131 if a running count of the number of transmission retries associated with wireless device 131 exceed a threshold number. In another example, base station 110 may allocate one CQICH slot every N uplink frames to wireless device 131 if the number of transmission retries associated with wireless device 131 exceed a threshold number of retries in a certain period of time. N may be a maximum allowable allocation rate for signal quality feedback slots (i.e., maximum bandwidth) to a single wireless device.

Figure 4:
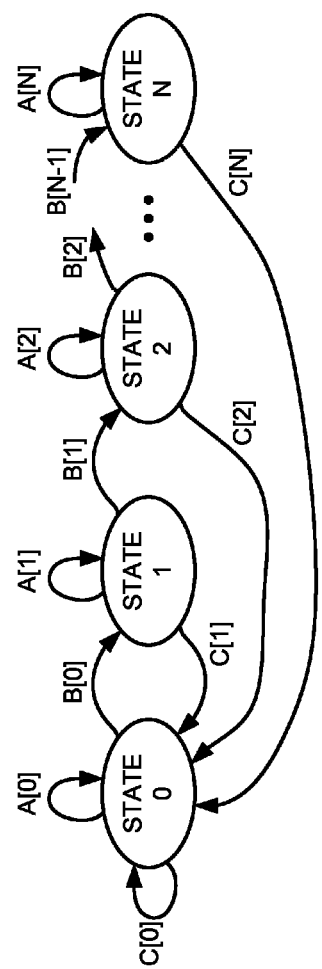
FIG. 4 is a state transition diagram illustrating a method of allocating signal quality feedback slots.

FIG. 4 is a state transition diagram illustrating a method of allocating signal quality feedback slots. The state transitions illustrated in FIG. 4 may be used by one or more elements of communication system 100 to allocate signal quality feedback slots.

FIG. 4 illustrates N+1 states numbered state 0 through state N. Each state has three possible transitions: A, B, and C. The A, B, and C transitions for a particular state are denoted using array notation with the state number being the index. For example, the A transition for state zero is denoted A[0], the B transition for state 2 is denoted B[2], and so on.

The A transition for state 0 (A[0]) transitions back to state 0. The B transition for state 0 (B[0]) transitions to state 1. The C transition for state 0 transitions back to state 0. The A transition for state 1 (A[1]) transitions back to state 1. The B transition for state 1 (B[1]) transitions to state 2. The C transition for state 1 transitions to state 0. The A transition for state 2 (A[2]) transitions back to state 2. The B transition for state 2 (B[2]) transitions to state 3 (not shown). The C transition for state 2 transitions to state 0. A B transition is shown coming from state N−1 to state N. The A transition for state N (A[N]) transitions back to state N. The C transition for state N transitions to state 0.

The states 0 through N may be used to allocate signal quality feedback bandwidth to a wireless device. A state associated with a wireless device is represented by the variable n. When a wireless device is associated with a given state, n, it is allocated a signal quality feedback slot once every $E^n$ frames. In an embodiment, E=2. When one of three transition conditions is satisfied (A, B, or C), the state associated with that wireless device is transitioned according to the transition diagram illustrated in FIG. 4 and the associated transition. In other words, the A[0] transition is made if n=0 and the A transition condition is satisfied. The B[1] transition is made if n=1 and the B condition is satisfied, and so on.

A B transition is made if an indicator of RF conditions does not change by a threshold amount for at least M consecutive frames. M is a threshold number chosen to regulate the frequency of B transitions. When any state transition is made, it resets the frame counter for a B transition. In an example, a B transition may be made if the modulation and coding scheme associated with a wireless device does not change for M consecutive frames. In another example, a B transition may be made if the SINR associated with a wireless device remains within a predetermined range (e.g., 3 dB) for M consecutive frames.

A C transition is made if an indicator of retries satisfies a retry criteria. For example, if a threshold amount (T) of retries are associated with a wireless device in M consecutive frames. Where T and M are threshold numbers chosen to regulate the frequency of C transitions. In an example, a C transition may be made if there are T HARQ retries associated with a wireless device in M frames. In other words, if T=3 and M=5, a C transition would be made if there are 3 HARQ retries associated with a particular wireless device in a 5 frame span.

An A transition is made if an indicator of RF conditions indicates an improvement in RF conditions by a threshold amount before M consecutive frames have passed without a state transition. M is the threshold number chosen to regulate the frequency of B transitions. In an example, an A transition may be made if the modulation and coding scheme associated with a wireless device changes to a higher bit rate modulation or a less redundant coding, or both. In another example, a B transition may be made if the SINR associated with a wireless device improves a threshold amount (e.g., 3 dB).

Figure 5:
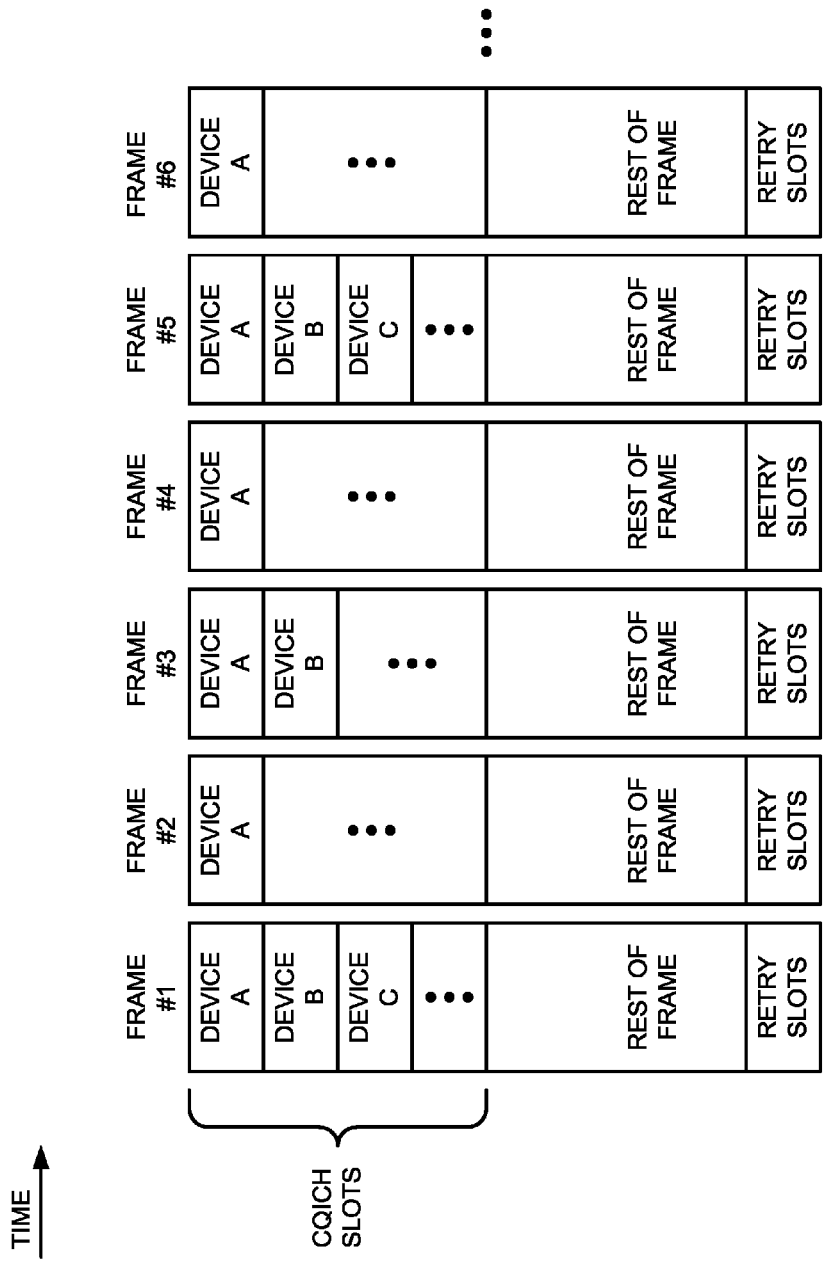
FIG. 5 is an illustration of an allocation of signal quality feedback slots.

FIG. 5 is an illustration of an allocation of signal quality feedback slots. The frames and signal quality feedback slot allocations depicted in those frames may be generated by one or more elements of communication system 100.

FIG. 5 illustrates a sequence of frames 1-6. Each frame has three parts, a CQICH part, a retry part, and the rest of the frame. In the CQICH part of frame 1, Device A, Device B, and Device C each are allocated a CQICH slot. In the CQICH part of frame 2, only Device A is allocated a CQICH slot. In the CQICH part of frame 3, Device A and Device B are each allocated a CQICH slot. In the CQICH part of frame 4, only Device A is allocated a CQICH slot. In the CQICH part of frame 5, Device A, Device B, and Device C each are allocated a CQICH slot. In the CQICH part of frame 6, only Device A is allocated a CQICH slot. The allocations of CQICH slots illustrated in FIG. 5 correspond to allocations of signal quality feedback bandwidth as controlled by the state transition diagram illustrated in FIG. 4 with: (1) E=2; (2) Device A being in state 0; (3) Device B being in state 1; and (3) Device C being in state 2.

Figure 6:
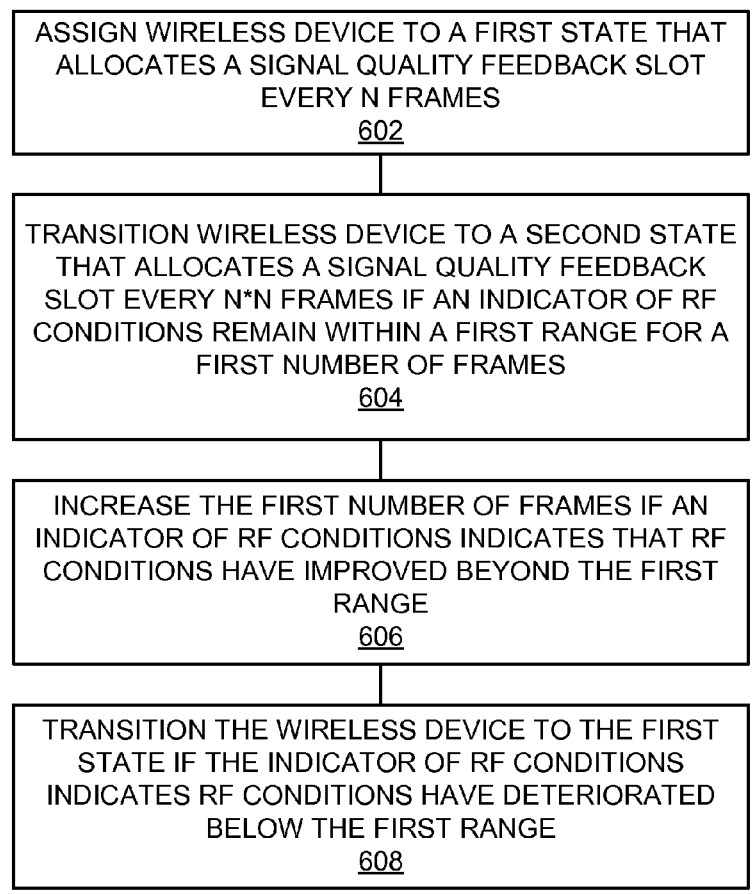
FIG. 6 is a flowchart illustrating a method of allocating signal quality feedback slots.

FIG. 6 is a flowchart illustrating a method of allocating signal quality feedback slots. The steps illustrated in FIG. 6 may be performed by one or more elements of communication system 100.

A wireless device is assigned to a first state that allocates a signal quality feedback slot every N frames (602). For example, base station 110 may assign wireless device 131 to a state n=1 whereby wireless device 131 is allocated a CQICH slot every $2^1=2$ frames.

The wireless device is transitioned to a second state that allocates a slot every N*N frames if an indicator of RF conditions remains within a first range for a first number of frames (604). For example, base station 110 may transition wireless device 131 to a state n=2 whereby wireless device 131 is allocated a CQICH slot every 2*2=4 frames if the modulation and coding scheme associated with wireless device 131 does not change for M frames. In another example, base station 110 may transition wireless device 131 to a state n=2 whereby wireless device 131 is allocated a CQICH slot every 2*2=4 frames if a SINR associated with wireless device 131 does not change by more than a threshold amount (e.g., 3 dB) for M frames.

The first number of frames is increased if an indicator of RF conditions indicates that RF conditions have improved beyond the first range (606). For example, base station 110 may increase M to 2*M if the modulation and coding scheme associated with wireless device 131 changes to a higher bit rate modulation and/or a less redundant coding scheme. In another example, base station 110 may increase the first number of frames by setting a frame count to zero if the modulation and coding scheme associated with wireless device 131 changes to a higher bit rate modulation and/or a less redundant coding scheme.

The wireless device is transitioned to the first state if the indicator of RF conditions indicates that RF conditions have deteriorated below the first range (608). For example, base station 110 may transition wireless device 131 to a state n=1 whereby wireless device 131 is allocated a CQICH slot every $2^1=2$ frames if the modulation and coding scheme associated with wireless device 131 changes to a lower bit rate modulation or a more redundant coding scheme. In another example, base station 110 may transition wireless device 131 to a state n=1 whereby wireless device 131 is allocated a CQICH slot every $2^1=2$ frames if a SINR associated with wireless device 131 decreases by more than a threshold amount (e.g., −3 dB).

The methods and systems described above may be implemented with or executed by one or more computer systems. The methods described above may also be stored on a computer readable medium. Many of the elements of communication system 100 may be, comprise, or include computers systems. This includes, but is not limited to base station 110; network 120; wireless device 130; wireless device 131 and backhaul link 150.

Figure 7:
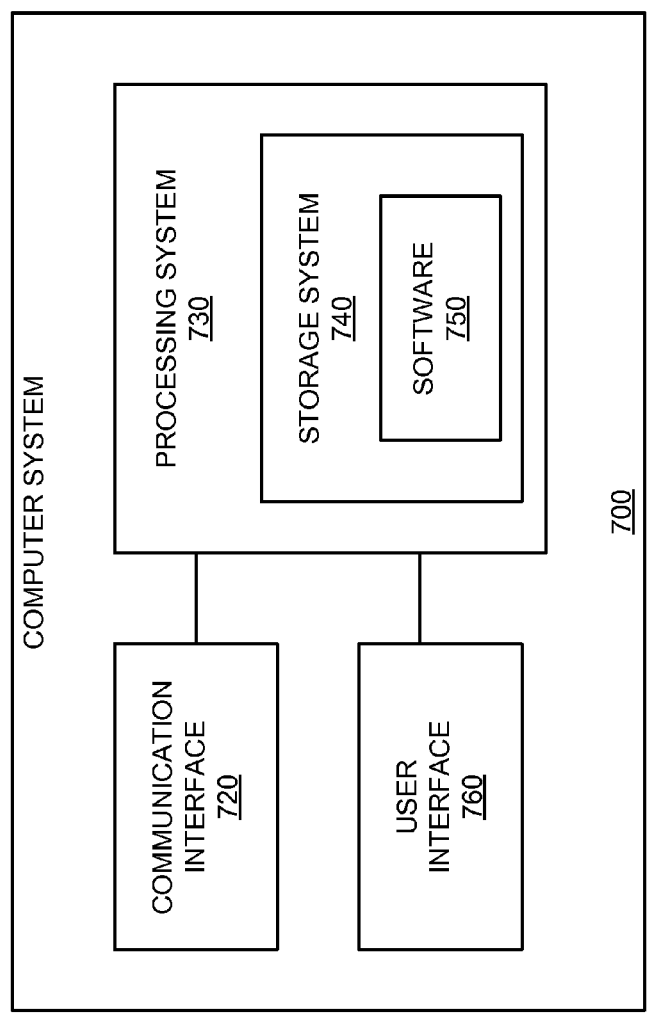
FIG. 7 is a block diagram of a computer system.

FIG. 7 illustrates a block diagram of a computer system. Computer system 700 includes communication interface 720, processing system 730, and user interface 760. Processing system 730 includes storage system 740. Storage system 740 stores software 750. Processing system 730 is linked to communication interface 720 and user interface 760. Computer system 700 could be comprised of a programmed general-purpose computer, although those skilled in the art will appreciate that programmable or special purpose circuitry and equipment may be used. Computer system 700 may be distributed among multiple devices that together comprise elements 720-760.

Communication interface 720 could comprise a network interface, modem, port, transceiver, or some other communication device. Communication interface 720 may be distributed among multiple communication devices. Processing system 730 could comprise a computer microprocessor, logic circuit, or some other processing device. Processing system 730 may be distributed among multiple processing devices. User interface 760 could comprise a keyboard, mouse, voice recognition interface, microphone and speakers, graphical display, touch screen, or some other type of user device. User interface 760 may be distributed among multiple user devices. Storage system 740 could comprise a disk, tape, integrated circuit, server, or some other memory device. Storage system 740 may be distributed among multiple memory devices.

Processing system 730 retrieves and executes software 750 from storage system 740. Software 750 may comprise an operating system, utilities, drivers, networking software, and other software typically loaded onto a computer system. Software 750 could comprise an application program, firmware, or some other form of machine-readable processing instructions. When executed by processing system 730, software 750 directs processing system 730 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating signal quality feedback slots, comprising:
   allocating, by an access node of a communication system, a signal quality feedback slot to a wireless device in one out of every $E^n$ channel quality indicator channel (CQICH) frames, wherein $0 \leq n \leq N_{max}$, wherein $N_{max}$ is a maximum number of states and E is an integer greater than one;
   increasing, by the access node, n when an indicator of RF conditions received in at least one signal quality feedback slot satisfies a first criteria;
   decreasing, by the access node, n to a minimum value, when a number of retry requests from the wireless device satisfies a retry criteria;
   maintaining, by the access node, a count of the number of consecutive frames the wireless device is allocated a slot; and
   resetting the count, when the indicator of RF conditions received in at least one signal quality feedback slot satisfies a second criteria,
   wherein the first criteria includes the count satisfying a third criteria.

2. The method of claim 1, wherein the indicator of RF conditions corresponds to a modulation and coding scheme being used by the wireless device.

3. The method of claim 1, wherein the third criteria comprises the count reaching a frame count threshold value.

4. The method of claim 1, wherein the second criteria includes the indicator of RF conditions indicating a threshold amount of improvement in RF conditions.

5. The method of claim 1, wherein the first criteria includes the indicator of RF conditions indicating RF conditions remain within a range of RF conditions.

6. The method of claim 1, wherein the retry criteria corresponds to a retry threshold number of retries being received over a first time period.

7. The method of claim 1, wherein the third criteria comprises the count reaching a frame count threshold value, the second criteria includes the indicator of RF conditions indicating a threshold amount of improvement in RF conditions,
   the first criteria includes the indicator of RF conditions indicating RF conditions remain within a range of RF conditions, and
   the retry criteria corresponds to a retry threshold number of retries being received over a first time period.

8. A method for allocating signal quality feedback bandwidth, comprising:
   assigning, by an access node of a communication system, a wireless device to a first state, wherein the first state allocates the wireless device a signal quality feedback slot every N frames and N is an integer greater than zero;
   transitioning, by the access node, the wireless device to a second state, when an indicator of RF conditions remains within a first range for a first number of frames, wherein the second state allocates the wireless device the signal quality feedback slot every N*N frames;
   increasing, by the access node, the first number of frames, when the indicator of RF conditions indicates that RF conditions have improved and exceed the first range; and
   transitioning, by the access node, the wireless device to the first state, when the indicator of RF conditions indicates RF conditions have deteriorated below the first range.

9. The method of claim 8, wherein the indicator of RF conditions corresponds to a modulation and coding scheme being used by the wireless device.

10. The method of claim 9, wherein the first range corresponds to a single modulation and coding scheme.

11. The method of claim 8, further comprising:
    transitioning the wireless device to a third state, when the indicator of RF conditions remains within the first range for an additional first number of frames, wherein the third state allocates the wireless device the signal quality feedback slot every N*N*N frames.

* * * * *